United States Patent [19]
Hamilton

[11] Patent Number: 5,161,588
[45] Date of Patent: Nov. 10, 1992

[54] TREE FELLING HEAD WITH COMBINATION TREE ACCUMULATOR AND TREE ABUTMENT

[75] Inventor: Douglas D. Hamilton, Mount Royal, Canada

[73] Assignee: Logging Development Corporation, Montreal, Canada

[21] Appl. No.: 801,881

[22] Filed: Dec. 3, 1991

[51] Int. Cl.⁵ ............................................. A01G 23/08
[52] U.S. Cl. ................................. 144/34 E; 144/3 D; 144/339
[58] Field of Search .................... 144/2 Z, 3 D, 34 R, 144/34 E; 83/928

[56] References Cited

U.S. PATENT DOCUMENTS

| | | |
|---|---|---|
| 3,920,057 | 11/1975 | Hamilton et al. . |
| 4,407,343 | 10/1983 | Brown .............................. 144/34 E |
| 4,491,163 | 1/1985 | Kurelek . |
| 4,690,185 | 9/1987 | Hamilton et al. . |
| 5,004,026 | 4/1991 | MacLennan et al. . |

FOREIGN PATENT DOCUMENTS 1065742 11/1979 Canada ................................ 144/339

Primary Examiner—W. Donald Bray
Attorney, Agent, or Firm—Stanley E. Johnson

[57] ABSTRACT

A felling head having a combination tree accumulator and abutment apparatus which eliminates the need for additional grapple arms to secure accumulated trees thus simplifying and lightening the felling head.

6 Claims, 1 Drawing Sheet

SEC. AA

TREE FELLING HEAD WITH COMBINATION TREE ACCUMULATOR AND TREE ABUTMENT

FIELD OF INVENTION

This invention relates generally to tree accumulating type felling heads and more particularly to a tree felling head incorporating a combined accumulator and abutment.

BACKGROUND OF INVENTION

There is a growing consensus in forest-based industries that felling heads have become too large, complex, and costly. Head weights in the 4000-6000# range are the norm. They require large carriers to provide the stability and power needed thus amplifying the weight, cost, and complexity aspects. In addition to the negative economic aspects of the foregoing, environmentalism demands that we reduce, to the greatest extent possible, the intrusive nature of harvesting operations on the forest environment.

Existing carriers take the felling heads to every tree if they are directly mounted on the carrier. If a boom is employed, they can reach several trees from one carrier position. These booms tend to be short and the carriers heavy in order to provide the necessary stability for the heavy felling heads. In either case a lot of traffic over the forest floor is necessary. This means a lot of soil degradation and damage to young tree growth.

These negative effects all stem from felling head weights which are reduced in proportion to reduction of those weights.

The types of severing devices in use and the grapple mechanism required to permit accumulation of cut trees are the major determining factors in felling head weights. In recent years there has been a strong swing to different types of saw severing devices. Many of these have added greatly to the weight and there is a growing interest in returning to lighter shearing devices - particularly for small tree operations such as thinning and harvesting the Boreal Forest where cut quality is not so important.

Accumulating capability so improves the performance of a felling head that it is mandatory on all heads. Grapple systems, which permit accumulation on felling heads, usually comprise 3 or 4 arms. These may be a mixture of fixed and/or pivoted. The pivoted arms may be one-piece or two-piece articulated (spring loaded or fully powered). In operation one or two arms (holding arms) hold the trees already cut and the remaining one or two arms (grappling arms) are used to encircle the next tree and move it into the accumulation once it has been cut. In general the holding arms are of the articulated type as is illustrated in U.S. Patents Kurelek 4,491,163- Hamilton et al 4,690,185 and MacLennan et al 5,004,026. Articulation permits withdrawal of the holding arms from between the accumulated trees and subsequent tree being moved into the accumulation by the grappling arms. The grappling arms may be one-piece or the two-piece articulated type.

My U.S. Pat. No. 3,920,057 discloses a shear type felling head. The shears are supported by inclined arms and two one-piece grapple arms are disclosed. The shears are powered by a single cylinder and the grapples preferably by separate cylinders. There are abutments above and below the grapples to locate the head on the tree and stabilize it once it has been cut. There are no special provisions for accumulation and if it is attempted the cut tree being held will fall vertically, when the grapples are opened to receive the next tree, and be cut again.

SUMMARY OF THE INVENTION

A principal object of the present invention is to provide felling head designs that will permit a significant reduction in weight and complexity, as compared to conventional heads, without loss of performance.

A further object of the invention is to employ shears supported by inclined arms and to install behind them a combined abutment and shelf which can be used to help locate the head on the tree to be cut, to support cut and accumulated trees, and to act as a stabilizer for the trees when they are being manoeuvred to a horizontal position.

A still further object of this invention is to employ two two-piece articulated grapple arms to provide the functions of both holding and grappling.

This invention is embodied in modifications of the felling head disclosed in U.S. Pat. No. 3,920,057 which overcomes the foregoing problem. The lower abutment is replaced by a combined abutment and shelf directly behind the cutting blades. When the grapples are opened the shelf supports the accumulated tree and prevents it dropping between the shear blades.

LIST OF DRAWINGS

The invention is illustrated by way of example with reference to the drawings wherein:

FIG. 1 is a partial side elevation of a felling head incorporating modifications provided by the present invention; and FIG. 2 is a partial section along line A—A of FIG. 1.

DESCRIPTION OF PREFERRED EMBODIMENT

The present invention is illustrated by way of example with reference to modifications to my aforementioned U.S. Pat. No. 3,920,057 the substance of which is incorporated herein by reference thereto.

Figure 1:
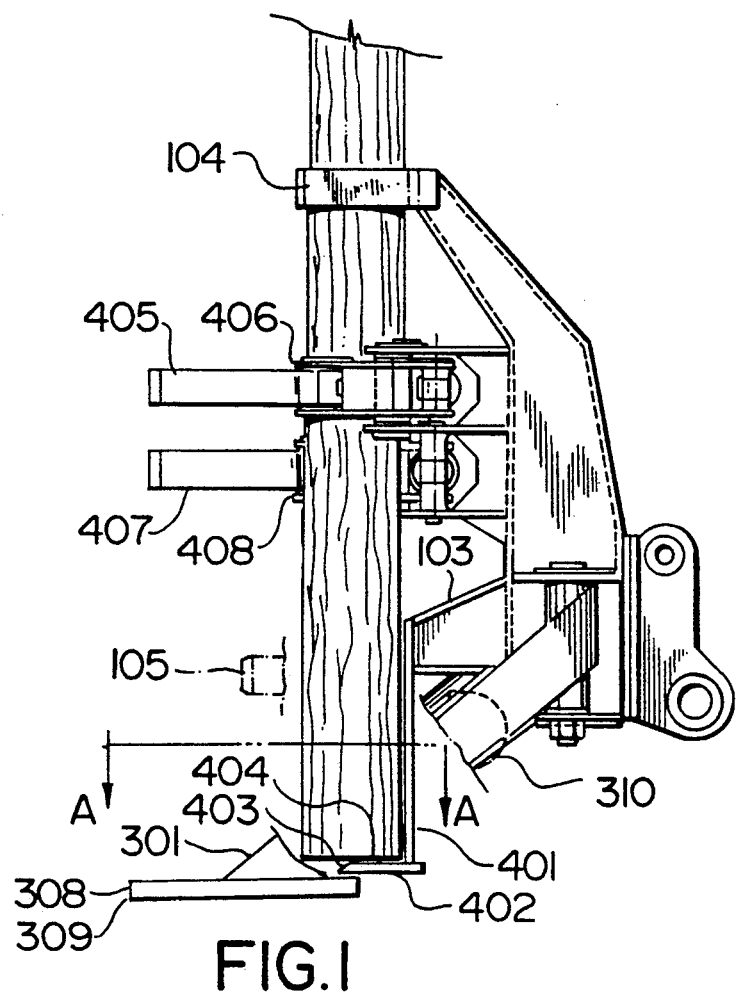
Figure 2:
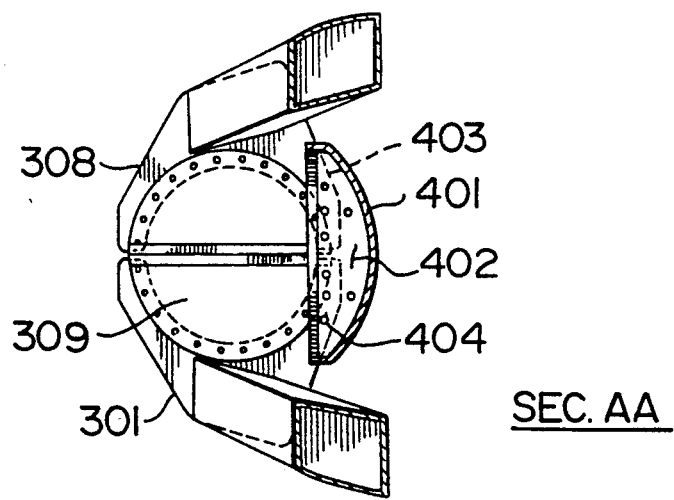

FIG. 1 hereof is FIG. 2 of U.S. Pat. No. 3,920,057 modified by moving cylinder 310 rearward, blade frames 308 and shear blades 309 forward and positioning between them—in replacement of lower abutment 105—a combined abutment 401 and shelf 402. Top abutment 104 has been moved to the rear to align it with the new abutment.

The combined abutment and shelf—shown in section—comprises a vertical member 401—arcuate in cross section for strength and fixed to the frame 103. Fixed to the base of member 401 is the shelf member 402. It has a sloped leading face 403 to act as a ramp for the incoming tree and optional spikes 404 or the like projecting up from the plate to help hold the severed tree in place on the shelf. It is obvious that the shelf member 402 could be positioned behind and in the plane of the blade member 309—or lower—thus avoiding the need for the ramp 403.

The grapple arms 405, 406 and 407, 408 are of the two-piece type. Two-piece articulated arms are well known to the industry (U.S. Pat. No. 4,491,163 for example) and while more expensive to manufacture they operate more effectively than the one-piece type. The latter, however, can be used.

FIG. 2 is section AA of FIG. 1. It illustrates the preferred shape of abutment 401 and shelf 402. It also illustrates the overlapping relationship of shelf 402 and shear frames 308 and blades 309. This is the preferred arrangement when shears are employed to give maximum compactness to the design. It necessitates the ramp 403 to ease the movement of the tree onto the shelf 402. It will be obvious to those skilled in the art that where saws are used a close alignment of the top surface of shelf 402 with the top plane of the kerf which will be made by the cutting member may be desirable.

In operation the felling head, with shear blades 309 and frames 308 open, is moved toward a tree to be cut until it contacts the tree with the sharpened edge of face 403 of the shelf 402. With the head in general alignment with the tree, the tree is loosely grappled by arms 405, 406 and 407, 408. The tree is then severed by activating the hydraulic cylinder 310 which brings the shear blades 309 on frames 308 together. The grapples 405, 406 and 407, 408 are subsequently caused to exert pressure on the tree which moves it up the shelf ramp 403 and onto the shelf 402. At the same time the tree makes contact with abutment 104. The process is repeated with the next tree with the opening of the arms 405, 406 and 407, 408 being delayed as long as possible so that the tree to be cut makes contact with and helps to stabilize the tree or trees already cut. (It is this part of the operation where two-piece articulated arms prove more effective than single piece arms.) In this way, a number of trees can be accumulated. The head is then manoeuvred and rotated toward a horizontal position and the arms 405, 406 and 407, 408 opened to release the trees where desired. During this manoeuvre the combined abutment 401 and shelf 402 act to help stabilize the trees.

This is one embodiment of my invention. It will be obvious to anyone skilled in the art that the essence of having the accumulating shelf behind the shear can be employed on other shear designs and on some type of saw designs as well such as chain saws and circular saws. The location of the shelf can be veried. It can also be varied in size to meet different accumulating requirements.

I claim:

1. A tree felling head for severing standing trees and accumulating a number of said trees in a substantially vertical position prior to releasing them comprising:
   (a) a frame;
   (b) a tree severing device pivotally attached to said frame to move so as to sever a standing tree, said severing device being a shear comprising two arms, pivotally attached to said frame, that extend in a direction downwardly and away from said frame and shear blades fixed to the outermost ends of said arms;
   (c) a combination heeling abutment and accumulating shelf attached to said frame, said heeling abutment being located at a position spaced rearwardly behind said severing device and said accumulating shelf being attached to said heeling abutment and extending substantially horizontally in a direction forwardly to a position adjacent a standing tree severed by said tree severing device;
   (d) two grapple arms attached to said frame above said tree severing device, at least one of said arms being movable toward and away from the other to embrace a tree to be severed; and
   (e) hydraulic power means to effect the functioning of said grapple and said tree severing device.

2. A felling head as defined in claim 1 wherein said grapple arms are each comprised of an inner element and an outer element pivotally connected together, said inner element being pivotally connected to said frame.

3. A felling head defined in claim 1, wherein means are provided on said frame to pivotally attach said felling head to a boom or the like.

4. A tree felling head comprising:
   (a) a frame;
   (b) a grapple mounted on said frame and having articulated arms for embracing a standing tree;
   (c) an upper abutment secured to said frame and engageable with a tree(s) embraced by the grapple;
   (d) a lower abutment secured to said frame and engageable with a tree grappled by the grapple after it has been severed from its roots;
   (e) a tree supporting platform secured to said lower abutment and projecting forwardly therefrom, said platform having a leading edge that is engageable with the tree as it is being severed from its roots, upwardly projecting formations on said platform for enhancing tractive engagement with the butt end of a tree(s) resting thereon;
   (f) a tree severing device comprising two arms pivotally mounted on said frame and extending in a direction away therefrom, each said arm having a shear blade secured thereto adjacent the free outer end thereof, said shear blades being disposed at a position for severing a standing tree grasped by the grapple; and
   (g) controllably operable means for operating said grapple and said severing means; said supporting platform and the leading edge thereof and said tree severing means being so positioned relative to one another that after a standing tree has been severed from its roots by said severing means the tree is shiftably movable rearwardly by said grapple to engage said lower abutment means and said upper abutment means.

5. A tree felling head as defined in claim 4 wherein said lower abutment comprises an arm depending downwardly from said frame and wherein said platform is located at the lower end of said arm.

6. A tree felling head as defined in claim 4 wherein said leading edge of said platform is a sharpened edge.

* * * * *